(12) United States Patent
Watson et al.

(10) Patent No.: US 8,171,744 B2
(45) Date of Patent: May 8, 2012

(54) METHOD AND APPARATUS FOR CONTROLLING TEMPERATURE FOR FORMING ICE WITHIN AN ICEMAKER COMPARTMENT OF A REFRIGERATOR

(75) Inventors: Eric K. Watson, Crestwood, KY (US); Matthew William Davis, Prospect, KY (US); Omar Haidar, Louisville, KY (US); Ronald Scott Tarr, Louisville, KY (US); Joseph Waugh, Louisville, KY (US)

(73) Assignee: General Electric Company, Schenectady, NY (US)

( * ) Notice: Subject to any disclaimer, the term of this patent is extended or adjusted under 35 U.S.C. 154(b) by 448 days.

(21) Appl. No.: 12/495,284

(22) Filed: Jun. 30, 2009

(65) Prior Publication Data

US 2010/0326093 A1 Dec. 30, 2010

(51) Int. Cl.
*F25C 1/00* (2006.01)
(52) U.S. Cl. .................... 62/66; 62/340; 62/344
(58) Field of Classification Search .............. 62/66, 118, 62/344, 137, 208, 441, 449, 132, 340, 419, 62/498; 29/890.035, 700
See application file for complete search history.

(56) References Cited

U.S. PATENT DOCUMENTS

| | | | | |
|---|---|---|---|---|
| 4,129,994 A * | 12/1978 | Ku | ..................... | 62/179 |
| 4,321,802 A * | 3/1982 | Sakamoto | ..................... | 62/330 |
| 4,513,574 A * | 4/1985 | Humphreys et al. | ............. | 62/59 |
| 4,662,183 A * | 5/1987 | Keller | ............................. | 62/138 |
| 4,691,529 A * | 9/1987 | Blomberg et al. | .............. | 62/332 |
| 4,738,121 A * | 4/1988 | Crabb, Jr. | ........................ | 62/347 |
| 5,186,012 A * | 2/1993 | Czachorski et al. | ............ | 62/114 |
| 5,259,363 A * | 11/1993 | Peacock et al. | ................ | 126/621 |
| 5,307,642 A * | 5/1994 | Dean | ................................... | 62/59 |
| 5,375,432 A * | 12/1994 | Cur | .................................. | 62/320 |
| 5,481,882 A * | 1/1996 | Watanabe et al. | ................. | 62/70 |
| 5,511,388 A * | 4/1996 | Taylor et al. | .................... | 62/389 |
| 5,546,757 A * | 8/1996 | Whipple, III | .................... | 62/225 |
| 5,564,284 A * | 10/1996 | Pugin | ............................ | 62/126 |
| 5,586,446 A * | 12/1996 | Torimitsu | ........................ | 62/126 |
| 5,849,213 A * | 12/1998 | Kawagoe et al. | ............ | 252/78.3 |
| 5,878,583 A * | 3/1999 | Schlosser et al. | ................ | 62/73 |
| 6,041,607 A * | 3/2000 | Kim | ................................. | 62/188 |
| 6,434,964 B1 * | 8/2002 | Tomiyama et al. | ............. | 62/354 |
| 7,029,587 B2 * | 4/2006 | Andrews | ........................ | 210/739 |
| 7,032,398 B2 * | 4/2006 | Dilk et al. | ........................ | 62/235 |
| 7,062,936 B2 * | 6/2006 | Rand et al. | ....................... | 62/347 |
| 7,165,412 B1 * | 1/2007 | Bean, Jr. | ........................ | 62/259.2 |
| 7,231,775 B2 * | 6/2007 | Dilk et al. | ........................ | 62/235 |
| 7,325,410 B1 * | 2/2008 | Bean, Jr. | .......................... | 62/137 |
| 7,418,825 B1 * | 9/2008 | Bean, Jr. | ....................... | 62/259.2 |
| 7,638,735 B2 * | 12/2009 | Petrenko | ........................ | 219/200 |
| 2005/0103029 A1 * | 5/2005 | Kawahara et al. | ............. | 62/126 |
| 2005/0109056 A1 * | 5/2005 | Rand et al. | ...................... | 62/340 |
| 2005/0218083 A1 * | 10/2005 | Andrews | ........................ | 210/748 |
| 2009/0064710 A1 * | 3/2009 | Kaga et al. | ...................... | 62/498 |

* cited by examiner

*Primary Examiner* — Mohammad Ali
(74) *Attorney, Agent, or Firm* — Global Patent Operation; Douglas D. Zhang

(57) ABSTRACT

A method of controlling temperature for forming ice within an icemaker compartment of a refrigerator is disclosed. The method includes the steps of activating at least one of the compressor and the coolant pump during an icemaking cycle to provide cooling to the icemaker compartment sufficient to make ice at a first rate, and increasing operation of at least one of the compressor and the coolant pump to provide cooling to the icemaker compartment sufficient to make ice at a second rate, which is faster than the first rate. A related refrigerator is also disclosed.

35 Claims, 9 Drawing Sheets

METHOD AND APPARATUS FOR CONTROLLING TEMPERATURE FOR FORMING ICE WITHIN AN ICEMAKER COMPARTMENT OF A REFRIGERATOR

BACKGROUND OF THE INVENTION

The present invention relates generally to refrigerators, and more specifically to compressors, coolant pumps and controls of refrigerators.

Generally, the cooling system of a refrigerator includes an evaporator, a compressor, a condenser, and an expansion device.

It is common in the art of refrigerators to provide an automatic icemaker. In a "side-by-side" type refrigerator where the freezer compartment is arranged to the side of the fresh food compartment, the icemaker is usually disposed in the freezer compartment and delivers ice through an opening in the access door of the freezer compartment. In this arrangement, ice is formed by freezing water with cold air in the freezer compartment, the air being made cold by the cooling system or circuit of the refrigerator. In a "bottom freezer" type refrigerator where the freezer compartment is arranged below a top fresh food compartment, convenience necessitates that the ice be dispensed through an opening in the access door of the fresh food compartment, rather than through the access door of the freezer compartment. It is known in the art that a way to form ice in this configuration is to deliver cold air, which is cooled by the evaporator of the cooling system, to an icemaker located in the fresh food compartment which may be on or near the access door to maintain the icemaker at a temperature below the freezing point of water.

One known approach is to use a thermoelectric device to make ice in the fresh food compartment. Thermoelectric icemakers are well known and commercially available. In one specific embodiment, a freezer air duct extends from the freezer compartment and into the fresh food compartment, and a small stream of air from the freezer compartment acts as a coolant for the heat released from the thermoelectric device. In the example embodiment, the freezer air performs multiple functions including cooling an ice storage bin, cooling the thermoelectric device and also for controlling the temperature of the fresh food compartment.

A thermoelectric device is also typically coupled with the ice mold body, the ice mold body having cavities for forming ice cubes, to heat the mold body before harvest of the ice cubes from the cavities to a storage area. Harvest of ice cubes involves removing the cubes from the ice mold by a mechanical force so that new ice cubes can be formed within the mold. The thermoelectric device heats the ice mold body to a temperature above the freezing point of water so that the ice cubes melt slightly and can be ejected by an ejection mechanism more easily.

After ejection of ice cubes, they are typically stored in a closely located bin. The temperature in the bin is typically not monitored, and remains cool by its placement within an icemaker compartment. Typically, temperature within the icemaker compartment is set by the temperature of the air from the freezer compartment that is distributed to it. This leaves no way for the icemaker compartment or the components therein to control the temperature or flow of the coolant distributed to it.

Typically, a refrigerator is provided with an evaporator or cooling coil that receives coolant from the refrigerator in a closed loop configuration where the coolant is expanded to a low pressure and temperature state for circulation through the heat exchanger to cool the space and objects within the refrigeration device.

Typically the compressor and a coolant pump work independently of each other, and either one, both or neither may be operating at a given point in time. This presents a challenge of poor coolant distribution while the compressor is activated and the coolant pump is deactivated, creating a situation where coolant in a typical vapor compression cycle gets colder but that coolant would not cool other areas of the refrigerator, specifically an icemaker compartment in a fresh food section of the refrigerator.

Generally the temperature within the ice storage bin is not monitored or controlled directly. There are several sources of heat within the icemaker compartment and there are periods when the icemaker compartment and ice storage bin specifically, are not being cooled. These factors cause the melting of stored ice cubes and liquid water creation in the ice storage bin. Upon further cooling and subsequent refreezing, the water and remaining ice cubes clump together, forming a mass of solid ice. Clumping of ice is undesirable because it hinders dispensing of the ice to the user.

Therefore, an ability to keep the temperature in the ice storage bin below freezing at all times is desired. In addition the convenience of being able to increase the rate of ice production during times of heavy usage is desirable.

BRIEF DESCRIPTION OF THE INVENTION

As described herein, the exemplary embodiments of the present invention overcome one or more of the above or other disadvantages known in the art.

One aspect of the present invention relates to a method of controlling temperature for forming ice within an icemaker compartment of a refrigerator. The refrigerator includes an icemaker compartment, a compressor and a coolant pump. The method comprises the steps of; activating at least one of the compressor and the coolant pump during an icemaking cycle to provide cooling to the icemaker compartment sufficient to make ice at a first rate, and increasing operation of at least one of the compressor and the coolant pump to provide cooling to the icemaker compartment sufficient to make ice at a second rate, which is faster than the first rate.

Another aspect of the present invention relates to a method of controlling temperature for forming ice within an icemaker compartment of a refrigerator. The refrigerator includes an icemaker compartment, a compressor and a fan. The method comprises the steps of; activating at least one of the compressor and the fan during an icemaking cycle to provide cooling to the icemaker compartment sufficient to make ice at a first rate, and increasing operation of at least one of the compressor and the fan to provide cooling to the icemaker compartment sufficient to make ice at a second rate, which is faster than the first rate.

Another aspect of the present invention relates to a method of maintaining a temperature for storing ice within an icemaker compartment of a refrigerator. The refrigerator includes an icemaker compartment, a fresh food compartment, a freezer compartment, a compressor, and a coolant pump. The method comprises the steps of; activating the compressor, and activating the coolant pump in response to activation of the compressor.

Another aspect of the present invention relates to a method of maintaining a temperature for storing ice within an icemaker compartment of a refrigerator. The refrigerator includes an icemaker compartment, a fresh food compartment, a freezer compartment, a compressor, and a fan. The method comprises the steps of activating the compressor, and activating the fan in response to activation of the compressor.

Another aspect of the present invention relates to a refrigerator. The refrigerator includes a fresh food compartment, a freezer compartment, an access door operable to selectively close the fresh food compartment, an icemaker compartment mounted on the access door, an icemaker disposed in the icemaker compartment, the icemaker comprising an ice mold body defining therein a plurality of ice cavities and an ice storage bin, a first temperature sensor disposed in the icemaker compartment, a heat exchanger disposed in the icemaker compartment, a compressor, a coolant pump, and a controller for regulating the coolant pump and the compressor.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and that, unless otherwise indicated, they are merely intended to conceptually illustrate the structures and procedures described herein.

DETAILED DESCRIPTION OF THE EXEMPLARY EMBODIMENTS OF THE INVENTION

Figure 1:
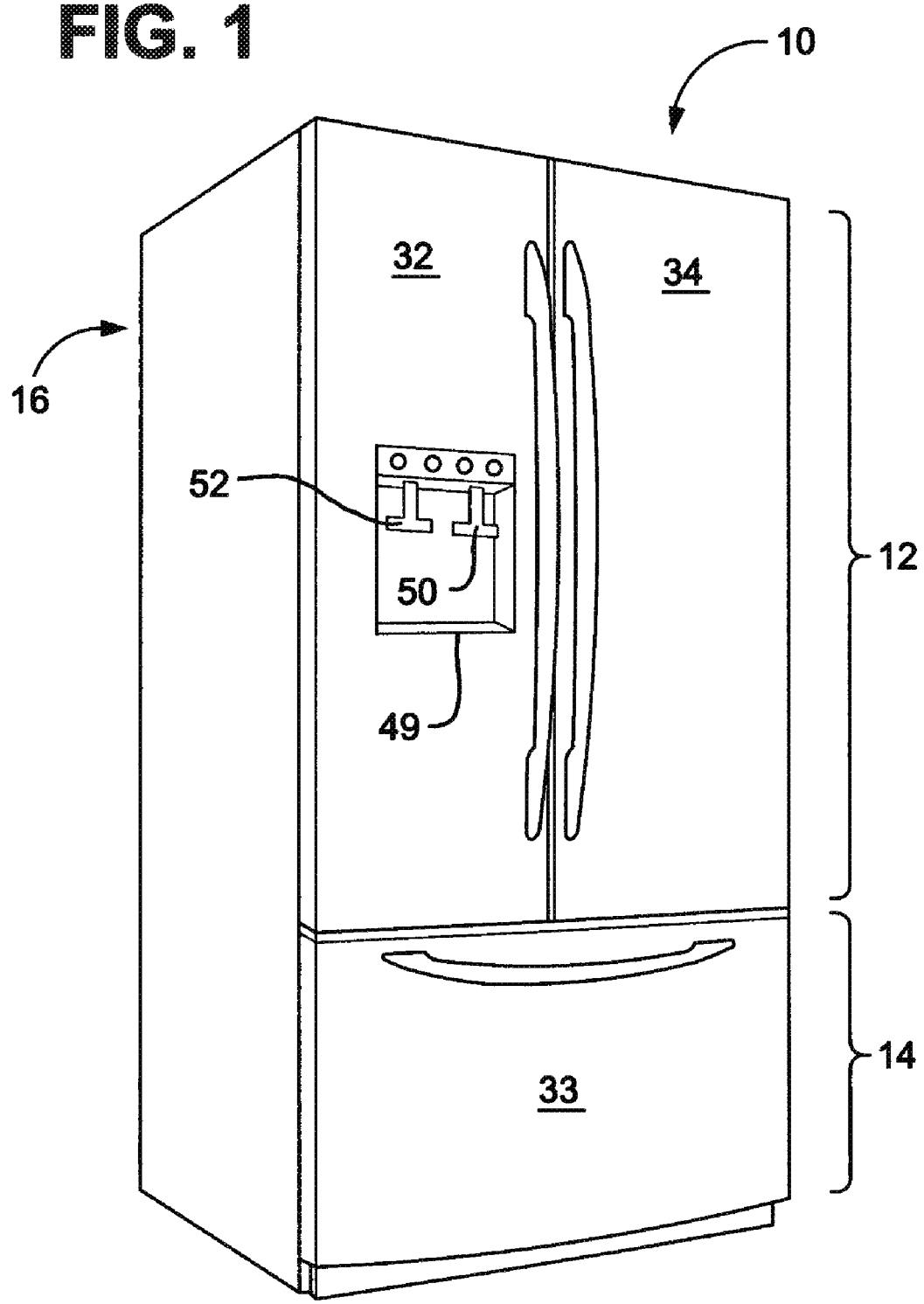
FIG. 1 is a perspective view of a refrigerator in accordance with an exemplary embodiment of the present invention.

FIG. 1 illustrates an exemplary refrigerator 10. While the embodiments are described herein in the context of a specific refrigerator 10, it is contemplated that the embodiments may be practiced in other types of refrigerators. Therefore, as the benefits of the herein described embodiments accrue generally to compressor and coolant pump control within the refrigerator, the description herein is for exemplary purposes only and is not intended to limit practice of the invention to a particular refrigeration appliance or machine, such as refrigerator 10.

On the exterior of the refrigerator 10, there is disposed an external access area 49 to receive drinking water and ice cubes. Upon a stimulus, a water dispenser 50 allows an outflow of drinking water into a user's receptacle. Upon another stimulus, an ice dispenser 52 allows an outflow of ice cubes into a user's receptacle. There are two access doors, 32 and 34, to the fresh food compartment 12, and one access door 33 to the freezer compartment 14. Refrigerator 10 is contained within an outer case 16.

Figure 2:
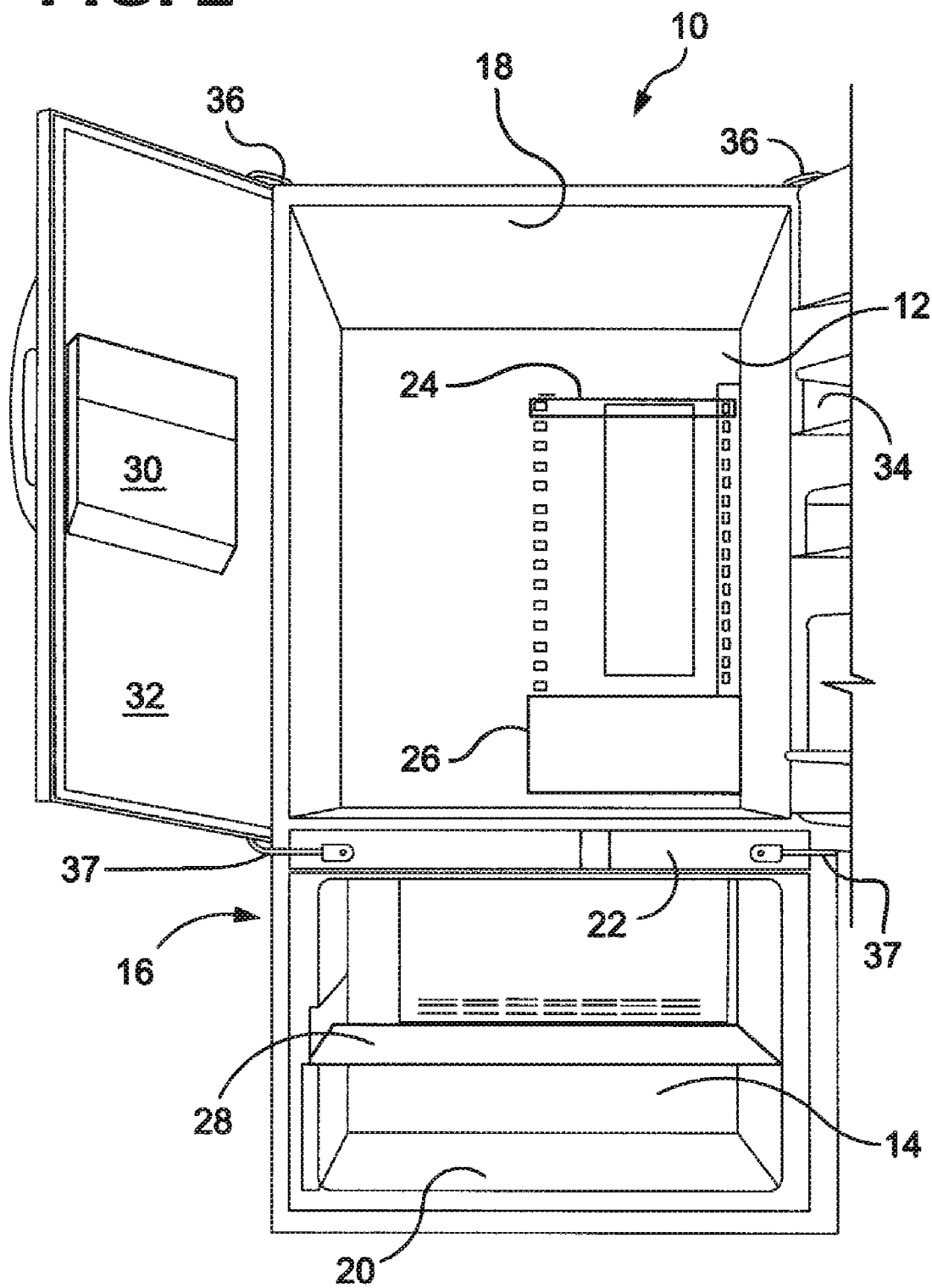
FIG. 2 is a perspective view of the refrigerator of FIG. 1 with the refrigerator doors being in an open position and the freezer door being removed for clarity.

FIG. 2 illustrates the refrigerator 10 with its upper access doors in the open position. Refrigerator 10 includes food storage compartments such as a fresh food compartment 12 and a freezer compartment 14. As shown, fresh food compartment 12 and freezer compartment 14 are arranged in a top and bottom mount refrigerator-freezer configuration. Refrigerator 10 includes an outer case 16 and inner liners 18 and 20. A space between outer case 16 and liners 18 and 20, and between liners 18 and 20, is filled with foamed-in-place insulation. Outer case 16 normally is formed by folding a sheet of a suitable material, such as pre-painted steel, into an inverted U-shape to form top and side walls of the case. A bottom wall of outer case 16 normally is formed separately and attached to the case side walls and to a bottom frame that provides support for refrigerator 10. Inner liners 18 and 20 are molded from a suitable plastic material to form fresh food compartment 12 and freezer compartment 14, respectively. Alternatively, liners 18, 20 may be formed by bending and welding a sheet of a suitable metal, such as steel. The illustrative embodiment includes two separate liners 18, 20 as it is a relatively large capacity unit and separate liners add strength and are easier to maintain within manufacturing tolerances.

The insulation in the space between liners 18, 20 is covered by another strip of suitable resilient material, which also commonly is referred to as a mullion 22. Mullion 22 in one embodiment is formed of an extruded ABS material.

Shelf 24 and slide-out drawer 26 can be provided in fresh food compartment 12 to support items being stored therein. A combination of shelves, such as shelf 28 is provided in freezer compartment 14.

In one embodiment, each of the doors 32, 34 are mounted by a top hinge assembly 36 and a bottom hinge assembly (not shown) to rotate about its outer vertical edge between a closed position, as shown in FIG. 1, and an open position, as shown in FIG. 2. Icemaker compartment 30 can be seen on the interior of left side fresh food compartment door 32.

Figure 3:
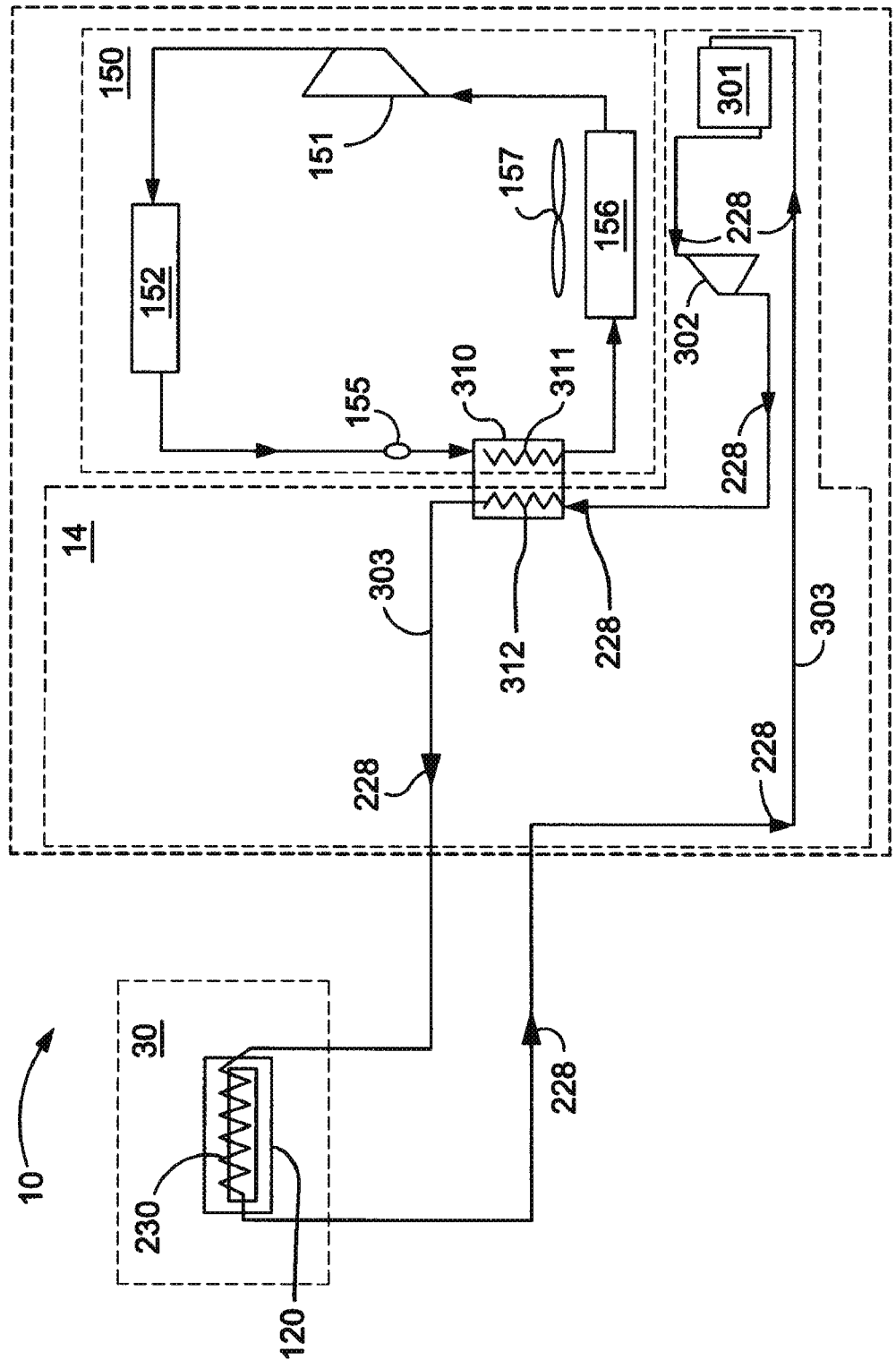
FIG. 3 is a schematic view of the refrigerator of FIG. 1, showing one exemplary embodiment.

FIG. 3 is a schematic view of refrigerator 10. In accordance with one exemplary embodiment of the present invention, refrigerator 10 includes an area that at least partially contains components for executing a known vapor compression cycle for cooling air in the compartments. The components include a compressor 151, a condenser 152, an expansion device 155, and an evaporator 156, connected in series and charged with a working medium. Collectively, the vapor compression cycle components 151, 152, 155 and 156 are referred to herein as sealed system 150. The sealed system 150 utilizes a working medium, such as R-134a. The working medium flows in tubes connecting the components of the sealed system 150. The construction of the sealed system 150 is well known and therefore not described in detail herein.

The sealed system 150 has a compressor 151 for compressing a working medium. When compressed, the working medium becomes heated. The working medium is decompressed or vaporized at expansion device 155 thereby decreasing the temperature of the working medium. The working medium passes through heat exchanger 310 before entering evaporator 156. Evaporator 156 may have a fan 157 to circulate air from freezer compartment 14 in a plenum (not shown) past evaporator 156 and back to freezer compartment 14 thereby cooling freezer compartment 14.

Heat exchanger 310 thermally connects the sealed system 150 with the icemaker compartment 30. However, heat exchanger 310 may not be directly connected to the sealed system 150 and may utilize heat transfer to the freezer compartment 14 as a means of cooling the coolant for icemaker compartment 30.

The icemaker compartment 30 includes an ice mold body 120. Components of the system to distribute coolant include a coil 312, a second heat exchanger 230, a tank 301, a coolant pump 302, and a coolant conduit 303 for transport of the coolant between heat exchanger 230 and coolant pump 302. In one embodiment, coolant pump 302 can be a variable speed coolant pump. Coil 312, coolant pump 302, and tank 301 may be disposed in freezer compartment 14.

Heat exchanger 310 has coil 311 as a part of the sealed system 150 and coil 312 as a part of the system to distribute coolant to icemaker compartment 30. The coils 311 and 312 are in thermal communication generally by a working fluid contained in heat exchanger 310, thereby transferring heat from one system to the other. It can be appreciated that coil 312 may be removed and the coolant may flow around coil 311 thereby transferring heat directly to the coolant without the use of a working fluid. Coolant pump 302 moves the coolant from tank 301 past or through heat exchanger 310 to icemaker compartment 30.

Second heat exchanger 230 thermally connects the coolant with the icemaker compartment 30.

When the coolant is a liquid, such as a food safe liquid in the nature of a mixture of propylene glycol and water, distribution of coolant to the icemaker compartment 30 can be achieved. Transport of the coolant within refrigerator 10 includes the coolant passing through heat exchanger 310, second heat exchanger 230, tank 301 and coolant pump 302, which delivers the pressure to circulate the coolant within icemaker compartment 30. Second heat exchanger 230 is in thermal communication with the ice mold body 120.

Figure 4:
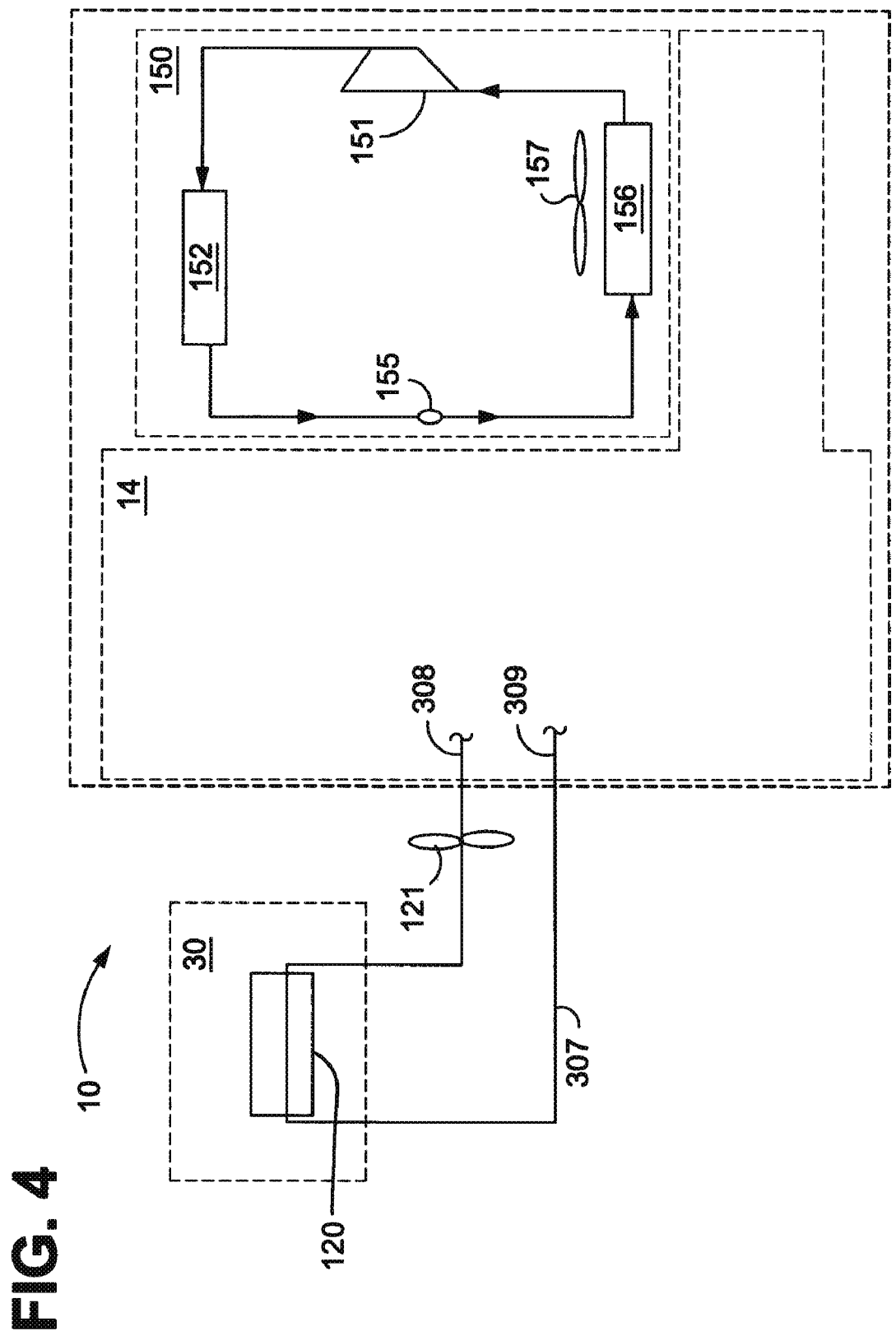
FIG. 4 is a schematic view of the refrigerator of FIG. 1, showing another exemplary embodiment.

FIG. 4 is a schematic view of the refrigerator of FIG. 1, showing another exemplary embodiment. In this exemplary embodiment, icemaker compartment 30 may be cooled by cold air from freezer compartment 14. Cold air from freezer compartment 14 is at a temperature below the freezing point of water. To transport cold air from freezer compartment 14 to icemaker compartment 30, an in-line icemaker fan 121 creates a pressure, causing air to flow through an air conduit 307. Cold air from freezer compartment 14 flows into air conduit 307, through an air conduit inlet 308, and flows out of the air conduit 307, after passing through ice compartment 30, through an air conduit outlet 309. Operation of in-line icemaker fan 121 is controlled by controller 305.

Therefore, there are two ice forming mediums that may be used. A first ice forming medium, a food safe liquid in the nature of a mixture of propylene glycol and water, may be used in the coolant distribution system to reduce the temperature in icemaker compartment 30, as seen in FIG. 3. Also, another ice forming medium, cold air from freezer compartment 14 can be delivered through air conduit 307, to reduce the temperature in icemaker compartment 30, as seen in FIG. 4.

Figure 5:
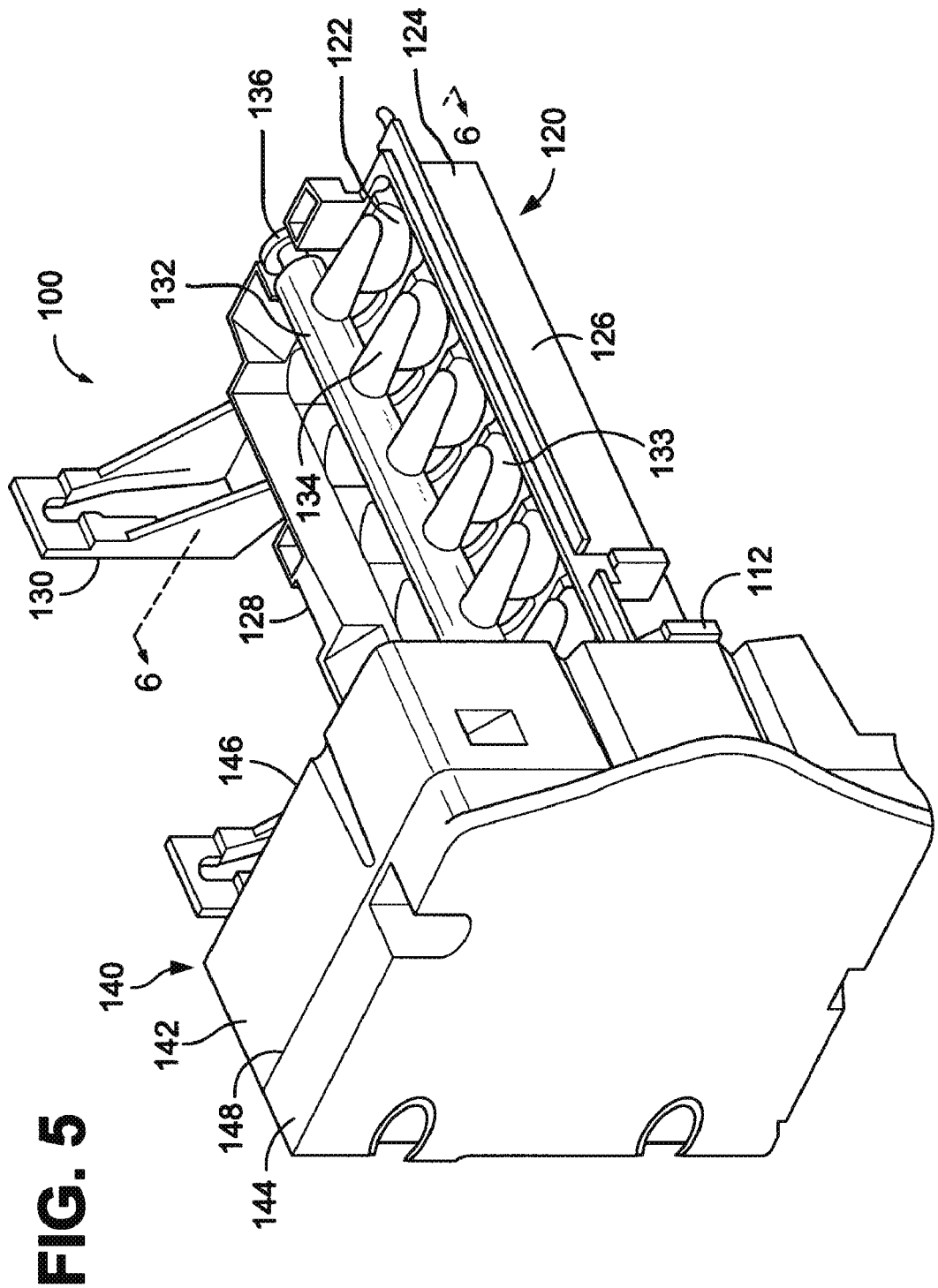
FIG. 5 is a perspective view of the icemaker disposed in the icemaker compartment of the refrigerator of FIG. 2.

FIG. 5 is a perspective view of icemaker 100 illustrating ice mold body 120 and a control housing 140. Ice mold body 120 includes an open top 122 extending between a mounting end 112 and a free end 124 of ice mold body 120. Ice mold body 120 also includes a front face 126 and a rear face 128. Front face 126 is substantially aligned with ice storage bin 240 (shown in FIG. 6) when icemaker 100 is mounted within icemaker compartment 30 such that ice cubes or pieces 242 are dispensed from ice mold body 120 at front face 126 into ice storage bin 240. Referring back to FIG. 5, in one embodiment, brackets 130 extend upward from rear face 128.

Ice mold body 120 includes rake 132 which extends from control housing 140 along open top 122. Rake 132 includes individual fingers 134 received within each of the ice cavities 133 of ice mold body 120. In operation, rake 132 is rotated about an axis of rotation or rake axis 136 that extends generally parallel to front face 126 and rear face 128. A motor (not shown) is housed within control housing 140 and is used for turning or rotating rake 132 about axis of rotation 136.

In the exemplary embodiment, control housing 140 is provided at mounting end 112 of ice mold body 120. Control housing 140 includes a housing body 142 and an end cover 144 attached to housing body 142. Housing body 142 extends between a first end 146 and a second end 148. First end 146 is secured to mounting end 112 of ice mold body 120. Alternatively, housing body 142 and ice mold body 120 are integrally formed. The end cover 144 is coupled to second end 148 of housing body 142 and closes access to housing body 142. In an alternative embodiment, end cover 144 is integrally formed with housing body 142. Housing body 142 houses a motor.

Figure 6:
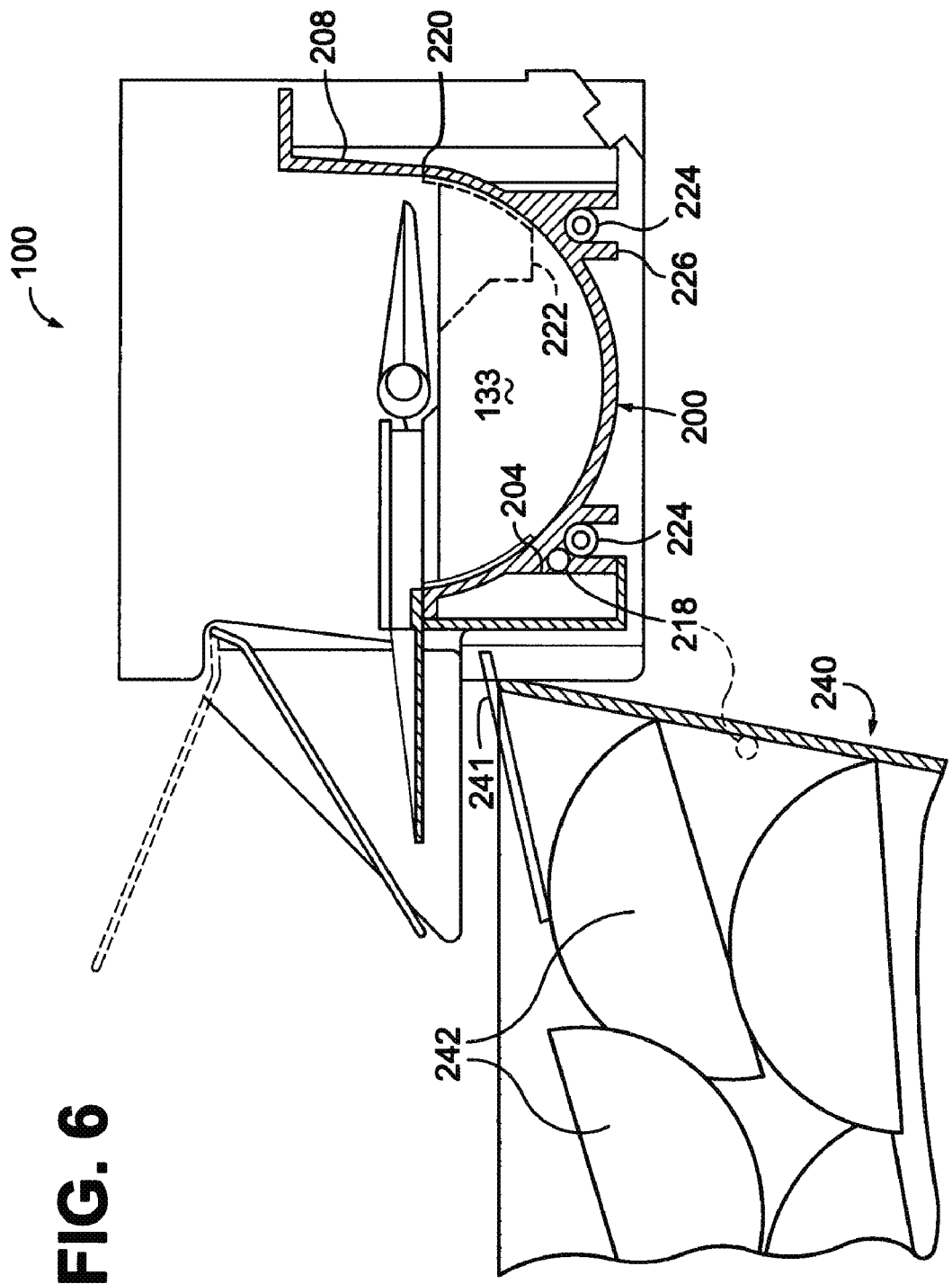
FIG. 6 is a cross sectional view of the icemaker of FIG. 4 along lines 6-6 of FIG. 5 together with an ice storage bin.

FIG. 6 is a cross sectional view of icemaker 100 taken along lines 6-6 of FIG. 5. Ice mold body 120 includes a bottom wall 200, a front wall 204, and a rear wall 208. In one embodiment, a temperature sensor 218 is adjacent to and in thermal connection with ice mold body 120, shown to be connected to front wall 204. In another embodiment, temperature sensor 218 is disposed in ice storage bin 240 for determining the temperature of the air around the stored ice cubes 242. In another embodiment, temperature sensor 218 may be in thermal connection with second heat exchanger 230, as seen in FIG. 3. Temperature sensor 218 is in communication with controller 305 for determination of temperature values during the ice making process.

Referring back to FIG. 6, a plurality of partition walls 220 extend transversely across ice mold body 120 to define the plurality of ice cavities 133 in which ice cubes 242 can be formed. Each partition wall 220 includes a recessed upper edge portion 222 by which water flows successively through and substantially fills the plurality of ice cavities 133 of ice mold body 120.

In this embodiment, two sheathed electrical resistance heating elements 224 are attached, such as by press-fitting, staking, and/or clamping into a bottom support structure 226 of ice mold body 120. The heating elements 224 heat ice mold body 120 when a harvest cycle begins in order to slightly melt ice cubes 242 to allow the ice cubes to be released from ice cavities 133. Rotating rake 132 sweeps through ice mold body 120 as ice cubes are harvested and ejects the ice cubes from ice mold body 120 into ice storage bin 240.

A sensor arm 241 evaluates the amount of ice within ice storage bin 240, and signals controller 305 to begin the ice making process to form more ice cubes, or stop the ice making process because enough ice is within ice storage bin 240.

Figure 7:
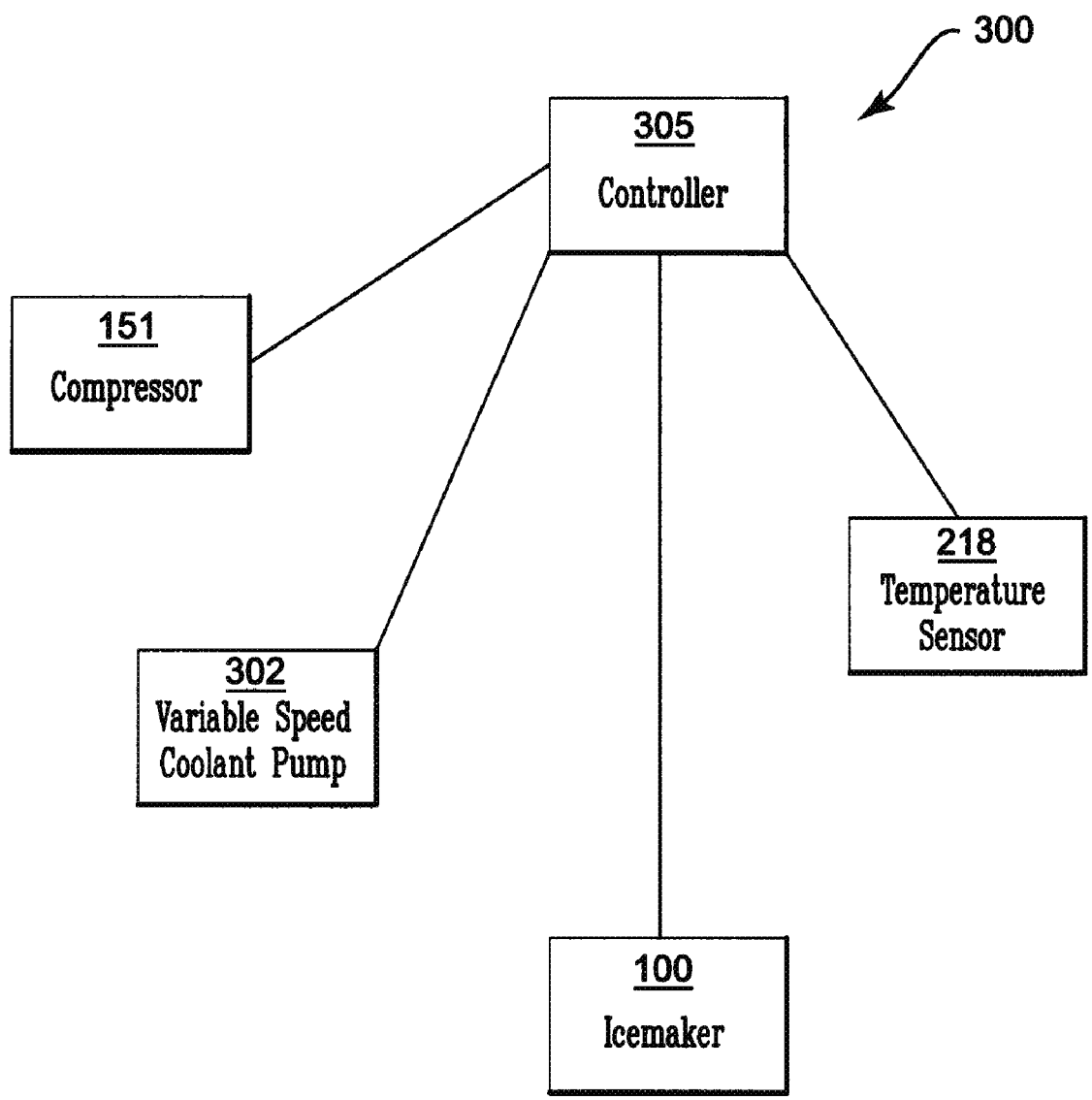
FIG. 7 is a block diagram of an exemplary control system.

FIG. 7 is a block diagram of an exemplary control system 300. Control system 300 includes a controller 305 which is in communication with icemaker 100, compressor 151, temperature sensor 218, and coolant pump 302. In one embodiment, controller 305 will be in communication with in-line icemaker fan 121 instead of coolant pump 302. Controller 305 controls the operation of the rake 132 and heating elements 224 of icemaker 100 during the harvest cycle. Controller 305 monitors the position of sensor arm 241, and controls the operation of, in one embodiment coolant pump 302, or in another embodiment in-line icemaker fan 121, for coolant distribution to icemaker compartment 30. Controller 305 also controls the operation of compressor 151 for compressing the working medium in sealed system 150.

Control of the coolant pump and compressor by monitoring variables within an icemaker compartment makes ice forming and ice storage more efficient. The controller monitors the amount of ice in the ice storage bin by the position of the sensor arm. If the sensor arm is at a position below a predetermined level of ice, the icemaker will enter the ice-making cycle. If the sensor arm is at a position above a predetermined level of ice, the icemaker will enter the ice storage phase.

During the icemaking cycle, the controller will activate at least one of the compressor and the coolant pump. In one embodiment, during the icemaking cycle, the coolant pump is activated first. The compressor could be left off initially if the evaporator is cold enough (−5 F or lower; otherwise, the compressor is activated as well). However, before the icemaking cycle is completed, the compressor will need to come on because there is not enough cooling capacity available if the compressor does not come on. Once being turned on, the compressor will reduce the temperature of the working medium in the sealed system. Once being turned on, the coolant pump will distribute a coolant to cool the icemaker compartment. In one embodiment the coolant is a mixture of glycol and water which is pumped through a heat exchanger in the icemaker compartment. In another embodiment, the coolant is cold air which is drawn from the freezer compartment into the icemaker compartment by the in-line icemaker fan. This activation will form ice at a first rate.

During the icemaking cycle the controller periodically activates and deactivates the coolant pump and/or compressor, while a temperature sensor in the icemaker compartment, preferably operatively connected to the ice mold body, measures the temperature of the ice mold body. The temperature sensor measures this temperature to determine if further cooling of the icemaking compartment is needed.

The rate of ice forming can be increased to a second rate by increasing the operation of at least one of the compressor and the coolant pump. The rate of ice formation can also be increased by increasing the operation of both the compressor and the coolant pump. A user may increase the ice rate to a second faster rate through an interface with the controller. This second rate will produce ice more quickly than the first rate. The controller can increase the operation of the coolant pump by increasing the speed of the coolant pump or by activating the coolant pump for a longer period of time than the period of time for making ice at the first rate. The controller can increase the operation of the compressor by activating the compressor for a longer period of time than the period of time for making ice at the first rate, or reduce the length of time the compressor is deactivated than the period of time for making ice at the first rate.

During the ice storage phase, the period of time during which no new ice is being made, in one embodiment, whenever the compressor is activated by the controller, the controller will activate the coolant pump in response to the activation of the compressor. The icemaker compartment must be cooled during ice storage to avoid the melting of stored ice cubes and subsequent refreezing which causes clumping of ice. Clumping of ice is undesirable because it hinders dispensing of the ice to the user.

The activation of the coolant pump in response to activation of the compressor allows a more frequent cooling of the icemaker compartment, reduces the number of times the compressor needs to turn on to cool the icemaker compartment individually, and efficiently cools the icemaker compartment through heat exchange between the coolant in the coolant conduit and the cooled working medium in the sealed system.

The compressor is activated by the controller based on one or more variables. The controller may activate the compressor if the temperature in either the fresh food compartment or the freezer is above a predetermined level. The controller may also reduce the predetermined temperature level in the freezer compartment in response to a temperature sensor measuring a first predetermined level in the icemaker compartment. Reducing the predetermined temperature level in the freezer compartment would cause the controller to activate the compressor if the temperature in the freezer compartment was above the newly reduced predetermined level. If the freezer is already below the newly reduced predetermined level, the controller would not activate the compressor based on this method. This reduced predetermined level would be about −21° C. The controller may also activate the compressor if a temperature sensor within the icemaker compartment measures a temperature that equals or exceeds a first predetermined temperature. Preferably this temperature sensor is disposed within the ice storage bin, to measure the temperature in close proximity to the stored ice.

The controller will deactivate the coolant pump and the compressor in response to the temperature sensor measuring a temperature that is equal to or less than a second predetermined temperature, which is lower than the first predetermined temperature.

In one embodiment of both the icemaking cycle and the ice storage phase, the coolant pump will be able to operate at variable flow rates depending on the demand at the time. For example, a variable speed coolant pump may pump less coolant when the icemaker compartment is in the ice storage phase, and may pump more coolant when the icemaker compartment is in the icemaking phase.

Figure 8:
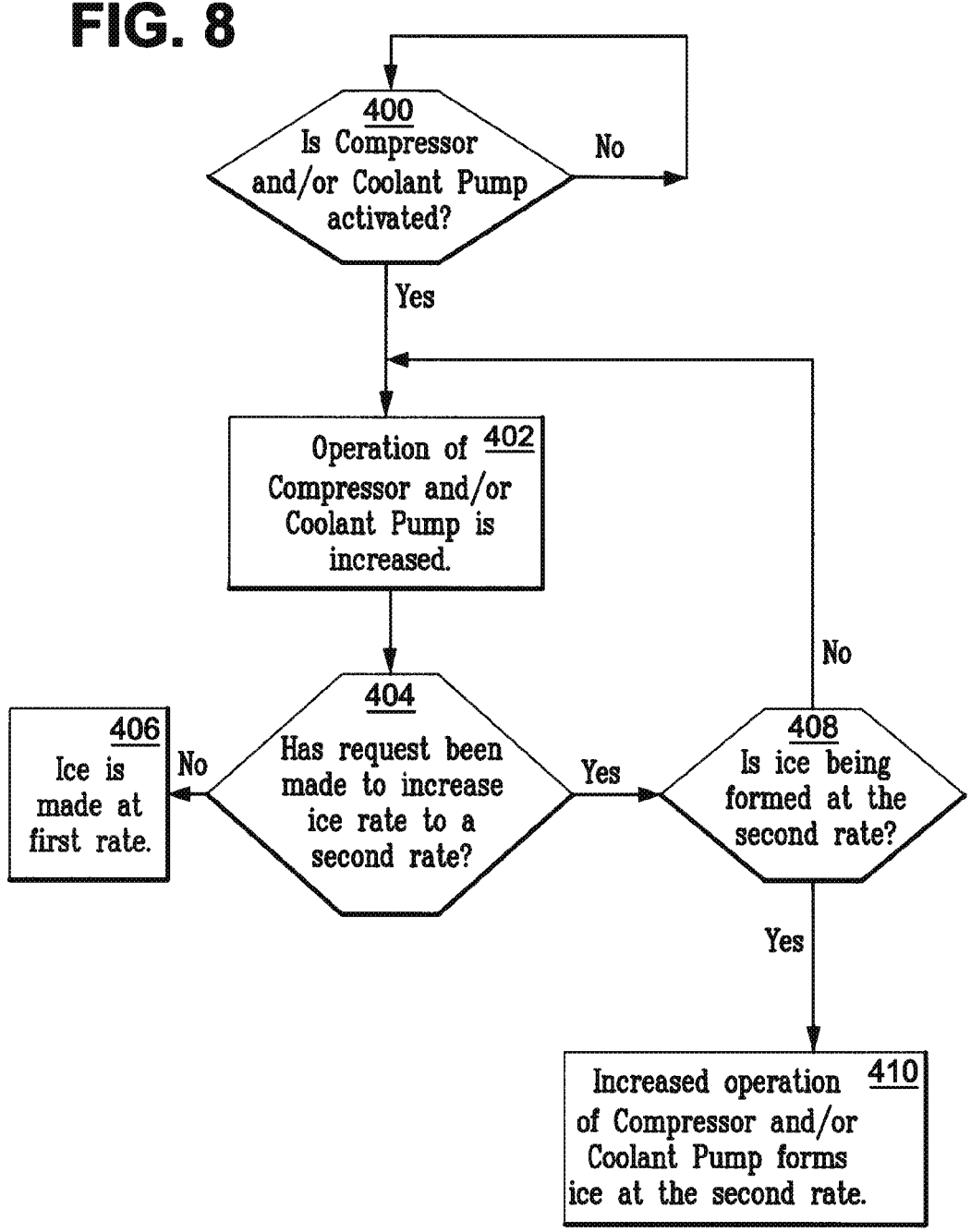
FIG. 8 is a flow diagram of an exemplary icemaking cycle.

FIG. 8 is a flow diagram showing an exemplary coolant pump and compressor control method for the icemaking cycle, starting at block 400. This method of coolant pump and compressor control is inputted into controller 305, as seen in FIG. 7, for example, by programming into memory of an application specific integrated circuit (ASIC) or other programmable memory device.

Referring back to FIG. 8, the system enters this routine when icemaking is called for, that is when the controller initiates the icemaking cycle. At block 400 controller 305 determines if at least one of the compressor 151 and the coolant pump 302 is activated. If at block 400, neither the compressor 151 nor the coolant pump 302 is activated, controller 305 will continue to ask until at least one of the compressor 151 and the coolant pump 302 is activated. In one embodiment, during an icemaking cycle, the coolant pump would be energized first. If the temperature of the evaporator is below a pre-set temperature, −5 F, for example, the compressor would remain off. If the temperature of the evaporator is above −5 F, the compressor would come on as well. Additionally, the temperature of the coolant going to the icemaker could be monitored. In this case, if the temperature of the coolant going to the icemaker is greater than 10 F the compressor will be turned on. If at block 400, at least one of the compressor 151 and the coolant pump 302 is activated, controller 305 will increase the operation of the activated one(s) of the compressor 151 and the coolant pump 302 at block 402.

At block 404, controller 305 will determine if a request has been made to increase the ice rate to a second rate. If at block 404, a request has not been made to increase the ice rate to a second rate, ice will be made at the first rate at block 406. If at block 404, a request has been made to increase the ice rate to a second rate, controller 305 will determine if ice is being formed at the second rate at block 408. If at block 408, ice is not being formed at the second rate, controller 305 will increase operation of at least one of the compressor 151 and the coolant pump 302 at block 402. For example, in one embodiment if a three-speed compressor and/or a three-speed coolant pump is used, controller 305 would adjust the operation speed of the compressor and/or the coolant pump from low speed to medium speed to high speed in order to meet the desired ice rate. If at block 408 ice is being formed at the second rate, controller 305 will maintain increased operation of at least one of the compressor 151 and the coolant pump 302 at block 406 until the ice storage phase, described below in FIG. 9.

Figure 9:
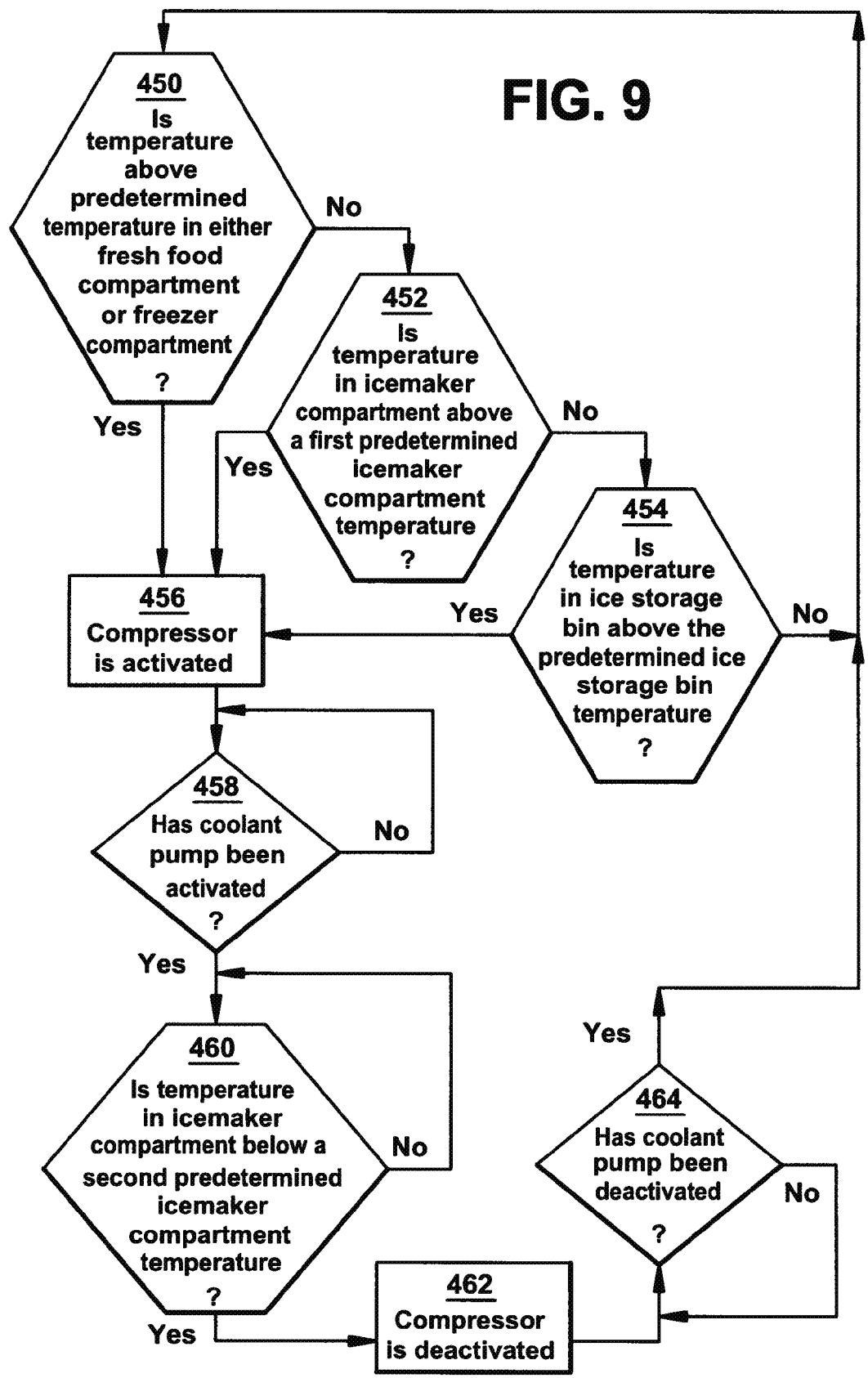
FIG. 9 is a flow diagram of an exemplary ice storage phase.

FIG. 9 is a flow diagram showing an exemplary coolant pump and compressor control method during the ice storage phase, starting at block 450. This method of coolant pump and compressor control is inputted into controller 305, as seen in FIG. 7, for example, by programming into memory of an application specific integrated circuit (ASIC) or other programmable memory device.

Referring back to FIG. 9, this routine is entered when the system calls for the ice storage phase. At block 450 controller 305 determines if the temperatures within the fresh food compartment 12 or freezer compartment 14 are above their respective predetermined temperatures. If at block 450, the temperatures in either the fresh food compartment 12 or freezer compartment 14 are above their respective predetermined temperatures, controller 305 will activate compressor 151 at block 456. If at block 450, the temperatures in both the fresh food compartment 12 and freezer compartment 14 are below the respective predetermined temperatures, controller 305 will determine if the temperature in the icemaker compartment is above a first predetermined icemaker compartment 30 temperature at block 452.

If at block 452 the temperature in the icemaker compartment 30 is above the first predetermined icemaker compartment temperature, controller 305 will activate compressor 151 at block 456. If at block 452 the temperature in the icemaker compartment 30 is below the first predetermined icemaker compartment temperature, controller 305 will determine if the temperature in ice storage bin 240 is above a predetermined ice storage bin temperature at block 454.

If at block 454 the temperature in ice storage bin 240 is above the predetermined ice storage bin temperature, controller 305 will activate compressor 151 at block 456. If at block 454 the temperature in ice storage bin 240 is below the predetermined ice storage bin temperature, controller 305 will then again determine if the temperatures within the fresh food compartment 12 or freezer compartment 14 are above their respective predetermined temperatures, at block 450.

At block 456, controller 305 activates compressor 151. At block 458 controller determines if coolant pump 302 has been activated. If at block 458 coolant pump 302 has not been activated, controller 305 will continue to ask if coolant pump 302 has been activated at block 458. If at block 458 coolant pump 302 has been activated, controller 305 determines if the temperature in icemaker compartment 30 is below a second predetermined icemaker compartment temperature at block 460. If at block 460 the temperature in icemaker compartment 30 is above the second predetermined icemaker compartment temperature, then controller 305 will continue to ask if the temperature in icemaker compartment 30 is above the second predetermined icemaker compartment temperature at block 460. If the temperature in icemaker compartment 30 is below the second predetermined icemaker compartment temperature at block 460, controller 305 will deactivate compressor 151 at block 462. Controller 305 will then determine if coolant pump 302 has been deactivated at block 464. At block 464 if coolant pump 302 has not been deactivated, controller 305 will continue to ask if coolant pump 302 has been deactivated at block 464. If at block 464 coolant pump 302 has been deactivated controller 305 will then again determine if the temperatures within the fresh food compartment 12 or freezer compartment 14 are above their respective predetermined temperatures, at block 450.

The fundamental novel features of the invention as applied to various specific embodiments thereof have been shown, described and pointed out, it will also be understood that various omissions, substitutions and changes in the form and details of the devices illustrated and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of controlling temperature for forming ice within an icemaker compartment of a refrigerator, the refrigerator including an icemaker compartment, a compressor and a coolant pump, the icemaker compartment including an ice mold body, the method comprising the steps of:
    (a) activating at least one of the compressor and the coolant pump during an icemaking cycle to provide cooling to the icemaker compartment sufficient to make ice at a first rate; and
    (b) increasing operation of at least one of the compressor and the coolant pump to provide cooling to the icemaker compartment sufficient to make ice at a second rate, which is faster than the first rate.

2. The method of claim 1, wherein the step of increasing the operation of the coolant pump is achieved by operating the coolant pump at a speed higher than the speed of operation for making ice at the first rate.

3. The method of claim 1, further including the step of periodically activating and deactivating the coolant pump and/or the compressor during the icemaking cycle.

4. The method of claim 3, wherein the step of increasing the operation of the coolant pump is achieved by activating the coolant pump for a longer period of time than the period of time for making ice at the first rate.

5. The method of claim 3, wherein the step of increasing the operation of the compressor is achieved by activating the compressor for a longer period of time than the period of time for making ice at the first rate.

6. The method of claim 3, wherein the step of increasing the operation of the compressor is achieved by reducing the length of time the compressor is deactivated than the period of time for making ice at the first rate.

7. The method of claim 1, wherein the step of increasing the operation is in response to a temperature sensor measuring a temperature equal to or greater than a predetermined temperature value within the icemaker compartment.

8. The method of claim 7, wherein the temperature sensor is operatively connected to the ice mold body.

9. A method of controlling temperature for forming ice within an icemaker compartment of a refrigerator, the refrigerator including an icemaker compartment, a compressor and a fan, the icemaker compartment including an ice mold body, the method comprising the steps of:
(a) activating at least one of the compressor and the fan during an icemaking cycle to provide cooling to the icemaker compartment sufficient to make ice at a first rate; and
(b) increasing operation of at least one of the compressor and the fan to provide cooling to the icemaker compartment sufficient to make ice at a second rate, which is faster than the first rate.

10. The method of claim 9, further including the step of periodically activating and deactivating the fan and/or the compressor during the icemaking cycle.

11. The method of claim 10, wherein the step of increasing the operation of the fan is achieved by one of either activating the fan at a speed higher than the speed of operation for making ice at the first rate, or activating the fan for a longer period of time than the period of time for making ice at the first rate.

12. The method of claim 10, wherein the step of increasing the operation of the compressor is achieved by one of either activating the compressor for a longer period of time than the period of time for making ice at the first rate, or reducing the length of time the compressor is deactivated than the period of time for making ice at the first rate.

13. The method of claim 9, wherein the step of increasing the operation is in response to a temperature sensor being operatively connected to the ice mold body and measuring a predetermined temperature.

14. A method of maintaining a temperature for storing ice within an icemaker compartment of a refrigerator, the refrigerator comprising an icemaker compartment, a fresh food compartment, a freezer compartment, a compressor, and a coolant pump, the icemaker compartment including an ice storage bin, the method comprising the steps of:
(a) activating the compressor; and
(b) activating the coolant pump in response to activation of the compressor.

15. The method of claim 14, wherein the step of activating the compressor is achieved in response to the temperature in either the fresh food compartment, or the freezer compartment, reaching or exceeding a predetermined level.

16. The method of claim 15, further comprising the step of reducing the value of the predetermined temperature level in the freezer compartment in response to a temperature sensor within the icemaker compartment measuring a first predetermined level.

17. The method of claim 14, wherein the step of activating the compressor is achieved in response to a temperature sensor within the icemaker compartment measuring a temperature equal to or greater than a first predetermined temperature.

18. The method of claim 17, wherein the temperature sensor is disposed within the ice storage bin.

19. The method of claim 17, wherein the first predetermined temperature is about −7° C.

20. The method of claim 17, further comprising the step of deactivating the coolant pump and the compressor in response to the temperature sensor measuring a temperature less than or equal to a second predetermined temperature, which is lower than the first.

21. The method of claim 20, wherein the second predetermined temperature is about −12° C.

22. A method of maintaining a temperature for storing ice within an icemaker compartment of a refrigerator, the refrigerator comprising an icemaker compartment, a fresh food compartment, a freezer compartment, a compressor, and a fan, the icemaker compartment including an ice storage bin, the method comprising the steps of:
(c) activating the compressor; and
(d) activating the fan in response to activation of the compressor.

23. The method of claim 22, wherein the step of activating the compressor is achieved in response to the temperature in either the fresh food compartment, or the freezer compartment, reaching or exceeding a predetermined level.

24. The method of claim 23, further comprising the step of reducing the temperature of the predetermined level in the freezer compartment in response to a temperature sensor within the icemaker compartment measuring a first predetermined level.

25. The method of claim 22, wherein the step of activating the compressor is achieved in response to a temperature sensor within the ice storage bin measuring a temperature equal to or exceeding a first predetermined temperature.

26. The method of claim 25, wherein the first predetermined temperature is about −7° C.

27. The method of claim 22, further comprising the step of deactivating the fan and the compressor in response to a temperature sensor measuring a temperature which is equal to or less than a second predetermined temperature, which is lower than the first.

28. The method of claim 27, wherein the second predetermined temperature is about −12° C.

29. A refrigerator comprising:
a fresh food compartment;
an access door operable to selectively close the fresh food compartment;
an icemaker compartment mounted on the access door;
an icemaker disposed in the icemaker compartment, the icemaker comprising an ice mold body defining therein a plurality of ice cavities and an ice storage bin;
a first temperature sensor disposed in the icemaker compartment;
a heat exchanger disposed in the icemaker compartment;
a compressor;
a coolant pump; and
a controller for regulating the coolant pump and the compressor.

30. The refrigerator of claim 29, wherein the coolant pump is a variable speed pump and wherein the controller activates at least one of the compressor and the coolant pump during an icemaking cycle to provide cooling to the icemaker compartment sufficient to make ice at a first rate, and selectively increases operation of at least one of the compressor and the coolant pump to provide cooling to the icemaker compartment sufficient to make ice at a second rate, which is faster than the first rate.

31. The refrigerator of claim 29, wherein the controller activates the coolant pump in response to activation of the compressor.

32. The refrigerator of claim 31, wherein the compressor is activated in response to a second temperature sensor within the icemaker compartment measuring a temperature which equals or exceeds a first predetermined temperature, and the coolant pump and the compressor are deactivated in response to the second temperature sensor measuring a temperature which is equal to or less than a second predetermined temperature, which is lower than the first.

33. The refrigerator of claim 29, wherein the controller activates the compressor in response to a second temperature sensor measuring a temperature which equals or exceeds a predetermined temperature in either the fresh food compartment, or the freezer compartment.

34. The refrigerator of claim 30, wherein the increase of operation is in response to a second temperature sensor, which is operatively connected to the ice mold body, measuring a temperature which equals or exceeds a predetermined temperature value.

35. The refrigerator of claim 32, wherein the second temperature sensor is disposed in the ice storage bin.

* * * * *